United States Patent [19]

Kojima

[11] Patent Number: 4,991,086
[45] Date of Patent: Feb. 5, 1991

[54] MICROPROGRAM CONTROLLED MICROPROCESSOR HAVING A PLURALITY OF INTERNAL BUSES AND INCLUDING TRANSFER REGISTER DESIGNATION SYSTEM

[75] Inventor: Shingo Kojima, Tokyo, Japan
[73] Assignee: NEC Corporation, Tokyo, Japan
[21] Appl. No.: 217,197
[22] Filed: Jul. 11, 1988

[30] Foreign Application Priority Data
Jul. 9, 1987 [JP] Japan ................ 62-172142

[51] Int. Cl.⁵ .................. G06F 3/00; G06F 9/06; G06F 13/00
[52] U.S. Cl. .................. 364/200; 364/232.8; 364/238.6; 364/240.2; 364/246.5; 364/247; 364/247.4; 364/247.6; 364/247.8; 364/260.2; 364/262.8
[58] Field of Search ... 364/200 MS File, 900 MS File

[56] References Cited

U.S. PATENT DOCUMENTS

| | | | |
|---|---|---|---|
| 3,644,901 | 2/1972 | Zingg | 364/900 |
| 3,932,841 | 1/1976 | Deerfield et al. | 364/200 |
| 3,938,098 | 2/1976 | Garlic | 364/200 |
| 4,133,030 | 1/1979 | Huettner et al. | 364/200 |
| 4,342,078 | 7/1982 | Tredennick et al. | 364/200 |
| 4,347,566 | 8/1982 | Koda et al. | 364/200 |
| 4,412,283 | 10/1983 | Mor et al. | 364/200 |
| 4,482,953 | 11/1984 | Burke | 364/200 |
| 4,509,115 | 4/1985 | Manton et al. | 364/200 |
| 4,597,074 | 6/1986 | Demichelis et al. | 370/79 |
| 4,719,568 | 1/1988 | Carrubba et al. | 364/200 |
| 4,833,640 | 5/1989 | Baba | 364/900 |

OTHER PUBLICATIONS

Motorola, MC68020 32-Bit Microprocessor Users Manual, 1985 (1-2, 1-3, 2-1, 2-2, 2-5, B-91).

Primary Examiner—Thomas C. Lee
Assistant Examiner—George C. Pappas
Attorney, Agent, or Firm—Foley & Lardner, Schwartz, Jeffery, Schwaab, Mack, Blumenthal & Evans

[57] ABSTRACT

A microprogram transfer register designation system for a microprogram controlled microprocessor which has a plurality of internal data buses such that there are previously prepared some number of source register sets each designating one source register for each of the internal buses and some number of destination register sets each designating one destination register for each of the internal buses, wherein one of the source register sets and one of the destination register sets is selected when an interregister transfer is executed. A transfer register designation field of a microcode includes at least one transfer inhibit flag for the internal buses.

4 Claims, 7 Drawing Sheets

MICROPROGRAM CONTROLLED MICROPROCESSOR HAVING A PLURALITY OF INTERNAL BUSES AND INCLUDING TRANSFER REGISTER DESIGNATION SYSTEM

BACKGROUND OF THE INVENTION

1. Field of the Invention

The present invention relates to a microprogram transfer register designation system for use in a microprogram controlled microprocessor having a plurality of internal buses, and, the present invention relates more specifically to a microprogram transfer register designation system for designating, by one transfer register code, one set of source registers and destination registers which are respectively of the same number as that of the internal buses.

2. Description of Related Art

At present, the control for internal hardware resources in microprocessors are mainly of a so-called microprogram control system. This system includes a read only memory (ROM) provided internally in the microprocessor for storing a microprogram composed of a sequence of control codes (called "microcodes") and a microprogram sequencer for sequentially reading and decoding the microcodes from the ROM for each one word so as to control various hardware resources in the microprocessors. The internal hardware resources in the microprocessor includes various arithmetic logic units and registers, and each microprogram instructs various operations such as interregister data transfer, logic operations, condition decisions, branches, etc., similarly to machine languages for computers.

In the microprogram, execution speed is preferred over generality and descriptivity of programs, and therefore, each instruction has as many functions as possible which can be executed in parallel, such as a transfer instruction, an arithmetic operation instruction, a conditional branch and the like so that a parallel operation will be realized to the maximum extent, and therefore the hardware resources are efficiently utilized. In this aspect, the microprogram is different from the machine language for general computers. Accordingly, ordinary microcodes have a plurality of fields in one instruction so that different functions are described independently of one another.

In the case of microprocessors having only one internal data bus, the microcodes are not so long and therefore, the microprogram control is very effective. However, in the case of microprocessors having two or more internal data buses, the microcodes need a field of a long word length for designating the source registers and the destination registers for data transfers made by using the respective internal data buses.

Conventionally, in order to shorten the field for the interregister transfer, there has been proposed to previously prepare some number of source register sets each designating one source register for each of the internal buses and some number of destination register sets each designating one destination register for each of the internal buses. In this manner, all possible combinations of source registers and destination registers cannot be prepared because the preparation for all possible combinations needs a very long field for designating the source register set and the destination register set. Therefore, the data transfer between a set of registers which is not included in the previously prepared combinations must be executed by sequentially executing the data transfers between two or more sets of registers which are included in the previously prepared combinations. This is disadvantageous in that the content of an unintended register is destroyed. In order to avoid the destruction of the data, the microprogram inevitably becomes more complicated.

SUMMARY OF THE INVENTION

Accordingly, it is an object of the present invention to provide a microprogram transfer register designation system which has overcome the above mentioned defect of the conventional one.

Another object of the present invention is to provide a microprogram transfer register designation system which is capable of executing the interregister transfer with a small number of steps.

The above and other objects of the present invention are achieved in accordance with the present invention by a microprogram transfer register designation system for a microprogram controlled microprocessor having a plurality of internal data buses, the system being such that there are previously prepared some number of source register sets each designating one source register for each of the internal buses and some number of destination register sets each designating one destination register for each of the internal buses, and then, there are selected one of the source register sets and one of the destination register sets when the interregister transfer is executed, wherein a transfer register designation field of a microcode includes a transfer inhibit flag for each of the internal buses.

With the provision of the transfer inhibit flag in the transfer register designation field, it is possible to prevent the destruction of the content of a register for which the data transfer is not required. As a result, without a substantial increase of the word length of the microcodes there can be obtained a result similar to the case in which all the registers are independently designated. Therefore, it is possible to increase the degree of freedom in describing the microprogram, and also, a simple interregister transfer sequence can be realized.

The above and other objects, features and advantages of the present invention will be apparent from the following description of preferred embodiments of the invention with reference to the accompanying drawings.

DESCRIPTION OF THE PREFERRED EMBODIMENTS

Figure 1:
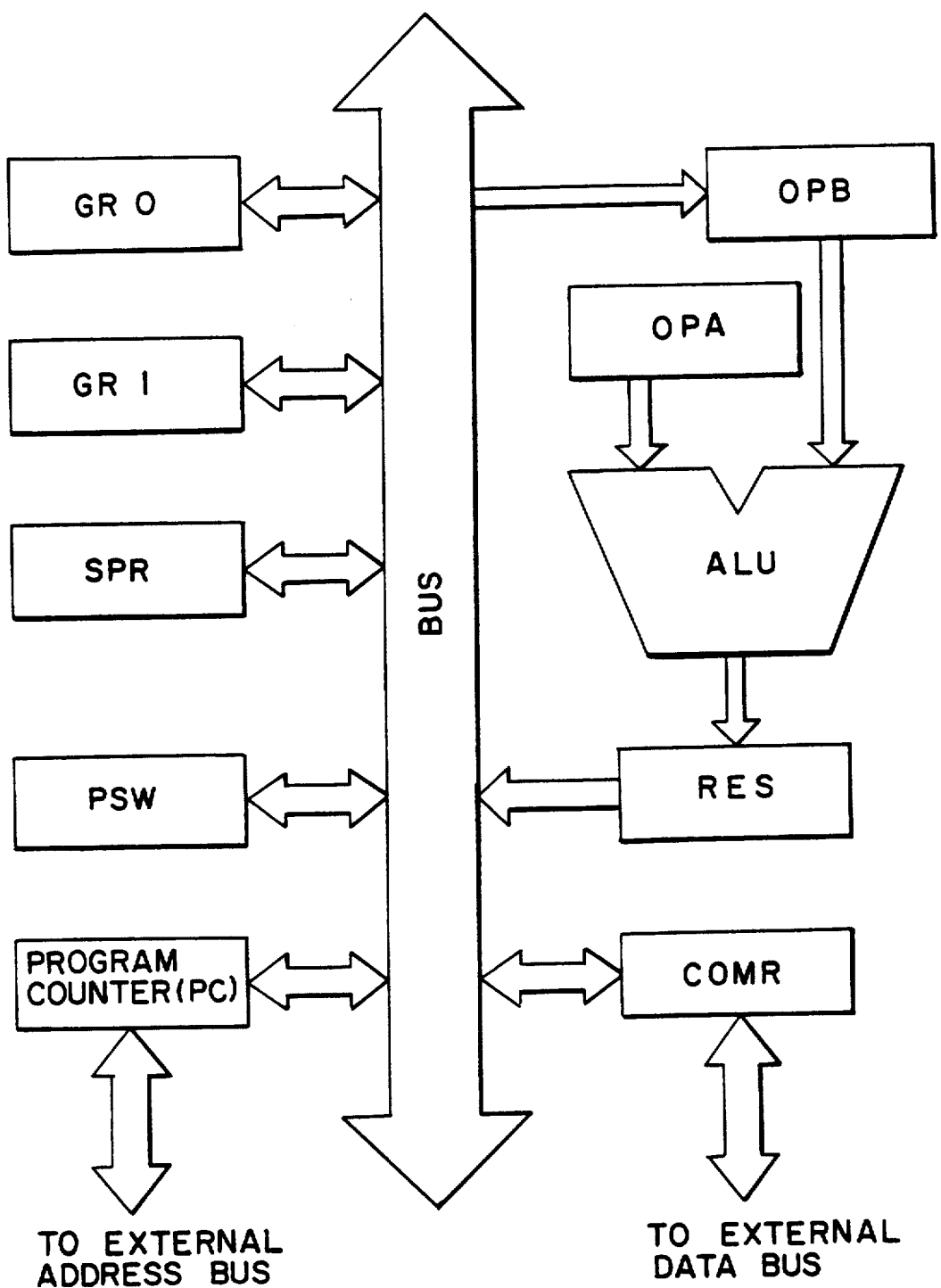
FIG. 1 is a block diagram of a typical conventional microprocessor having only one internal bus.

Referring to FIG. 1, there is shown a diagram of a typical conventional microprocessor having only one internal bus. The shown microprocessor comprises a pair of operand registers OPA and OPB coupled to an internal bus BUS so as to receive a pair of operands A and B, respectively. These operand registers OPA and OPB are coupled to a pair of inputs of an arithmetic logic unit ALU which in turn outputs the results of a designated operation to a operation result register RES coupled to the internal bus BUS.

Furthermore, to the internal bus BUS there are coupled a communication register COMR coupled to an external data bus and a program counter PC coupled to an external address bus. In addition, a program status word PSW, a scratch pad register SPR and general registers GR0 and GR1 are coupled to the internal bus BUS.

The above mentioned structure of the microprocessor is fundamental and well known to persons skilled in the art, and therefore, further description will be omitted.

TABLE 1

| SOURCE REGISTER | CODE | DESTINATION REGISTER | CODE |
|---|---|---|---|
| GR0 | 000 | GR0 | 000 |
| GR1 | 001 | GR1 | 001 |
| SPR | 010 | SPR | 010 |
| RES | 011 | OPA | 011 |
| — | — | OPB | 100 |
| PSW | 101 | PSW | 101 |
| PC | 110 | PC | 110 |
| COMR | 111 | COMR | 111 |

TABLE 2

| OPERATION | CODE |
|---|---|
| NOP | 000 |
| INC | 001 |
| ADD | 010 |
| SUB | 011 |
| NOT | 100 |
| AND | 101 |
| OR | 110 |
| EXOR | 111 |

TABLE 3

| CONDITION | CODE |
|---|---|
| HALT | 00 |
| CONDITIONAL BRANCH | 01 |
| CONDITIONAL SUBROUTINE CALL | 10 |
| RETURN FROM SUBROUTINE | 11 |

TABLE 4

| CONDITION | CODE |
|---|---|
| NO BRANCH | 000 |
| UNCONDITIONAL BRANCH | 001 |
| RES = 0 | 010 |
| CARRY OF RES = 1 | 011 |
| LSB OF RES = 1 | 100 |
| MSB OF RES = 1 | 101 |
| A TERMINAL = HIGH | 110 |
| B TERMINAL = HIGH | 111 |

In the microprocessor shown in FIG. 1, a source register and a designation register for interregister transfer can be designated as indicated in TABLE 1. Therefore, a field for designating the transfer registers needs three bits for each of the source register and the destination register. In addition, assuming that the operations designated for the ALU includes eight operations indicated in TABLE 2, a field for designating the operation of the ALU requires three bits.

Further, assume that a microsequencer controls the operation in four manners, as indicated in TABLE 3, and one of eight conditions shown in TABLE 4 can be selected in the case of the conditional branch. Also, assume that the branch address can be designated by a relative address of an eight-bit displacement. Under these conditions, two bits are required for the microsequencer control field, and three bits and eight bits are needed for the branch condition designation field and the branch address designation field, respectively. Therefore, the field for controlling the operation of the microsequencer includes thirteen bits.

Figure 2:
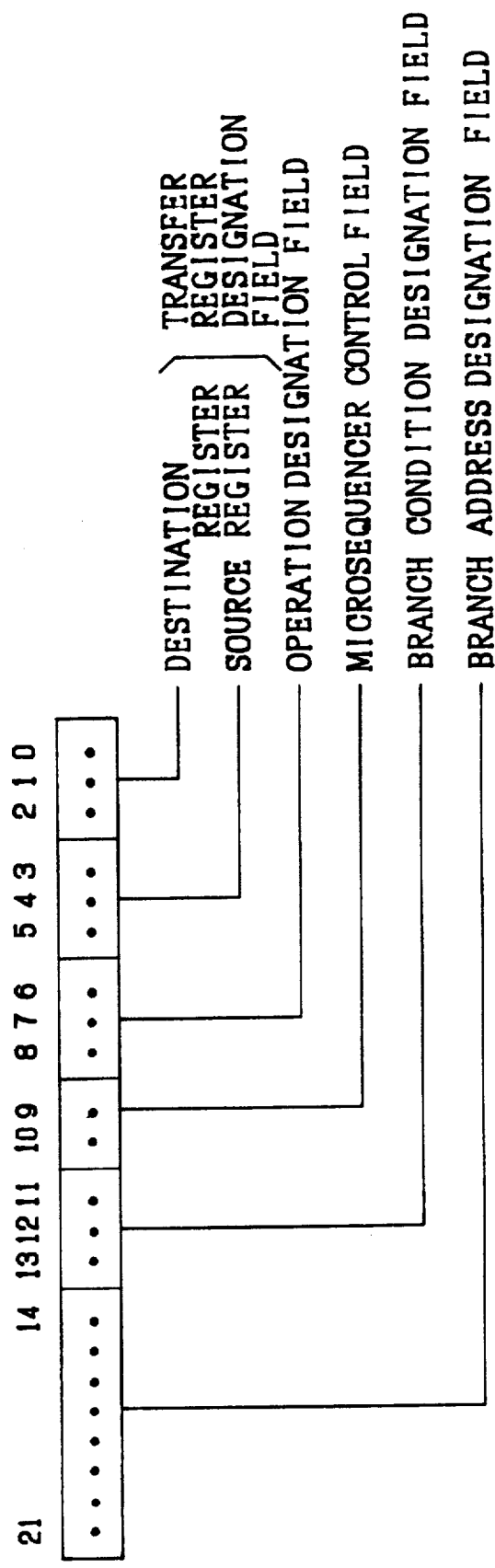
FIG. 2 illustrates a field structure of a microcode used in the microprocessor shown in FIG. 1.

Thus, the microprocessor shown in FIG. 1 uses the microcode of 22 bits having a field structure as shown in FIG. 2. Incidentally, "A terminal=high" in TABLE 4 means that when a signal of a high level is inputted to an A terminal from an external of the microprocessor, a branch is needed. "B terminal=high" in TABLE 4 has a similar meaning.

In the microprocessor shown in FIG. 1 having only one internal bus, the transfer register designation field needs only six bits in total which is sufficiently smaller than the total bit length of the microcode. However, recently, there have been proposed and actually used microprocessors having a plurality of internal data buses to speed up to the operation, and numerical data processors having a number of internal registers and correspondingly a plurality of internal data buses. In these processorsm the microcodes or microinstructions have to include a transfer field independently for each of the respective data buses.

Figure 3:
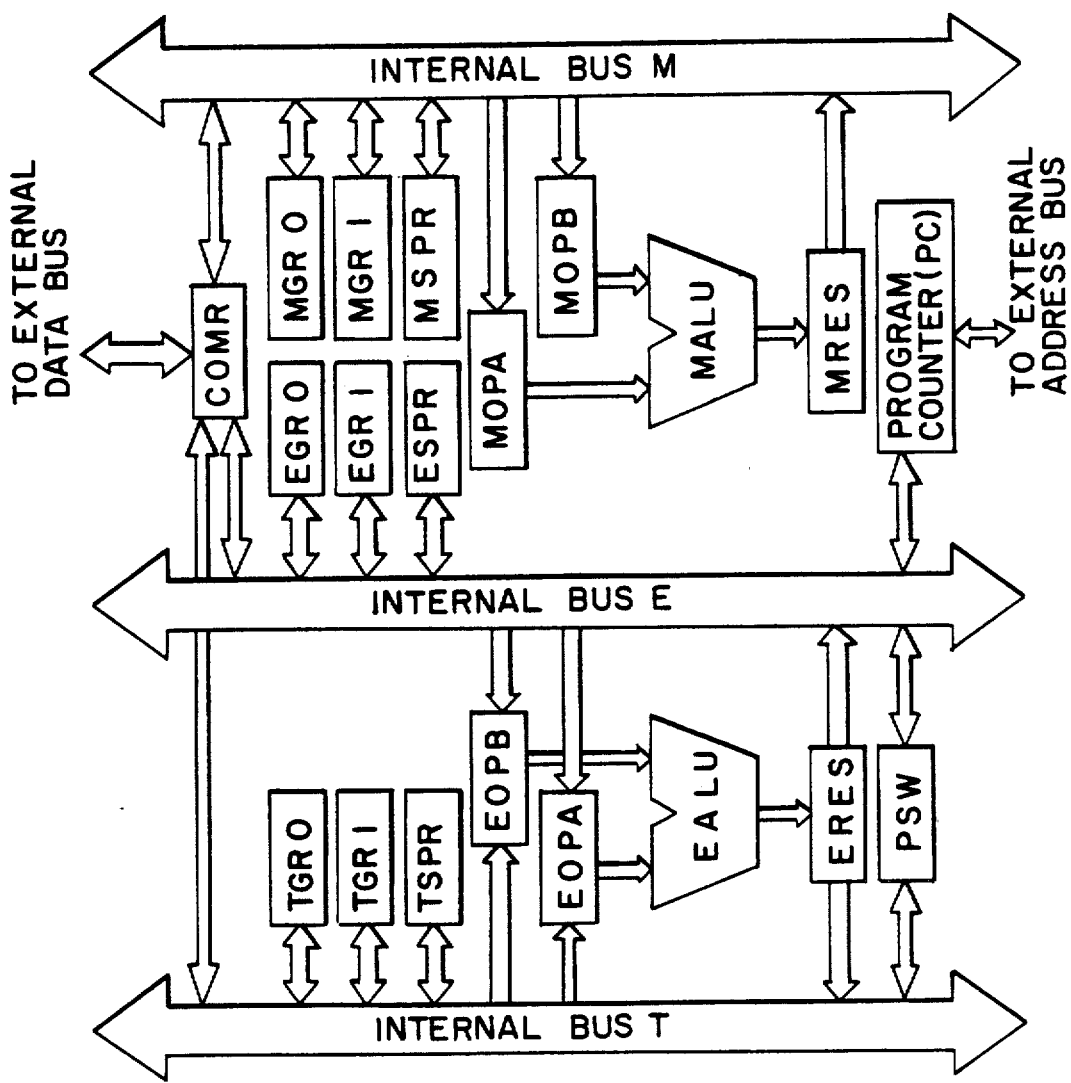
FIG. 3 is a block diagram of a typical conventional microprocessor having three internal buses.

Turning to FIG. 3, there is shown a block diagram of a typical conventional microprocessor having three kinds of internal buses T, E and M. The shown microprocessor shown in FIG. 3 includes a main arithmetic logic unit MALU and an extra arithmetic logic unit EALU.

The MALU includes a pair of inputs respectively coupled to a pair of operand registers MOPA and MOPB coupled to the internal bus M so as to receive a pair of operands A and B, respectively. An operation result register MRES coupled to an output of the arithmetic logic unit MALU is coupled to the internal bus M.

On the other hand, the EALU includes a pair of inputs respectively coupled to a pair of operand registers EOPA and EOPB which are coupled to the internal buses E and T, respectively so as to receive a pair of operands A and B. An operation result register ERES coupled to an output of the EALU is coupled to the internal buses E and T, respectively.

Furthermore, a communication register COMR coupled to an external data bus is coupled to the internal buses T, E and M, respectively, and a program counter PC coupled to an external address bus is coupled to the internal bus E. To the internal bus T there are coupled a scratch pad register TSPR and general registers TGR0 and MGR1. To the internal bus E there are also coupled a scratch pad register ESPR and general registers EGR0 and MGR1. Further, to the internal bus M there are coupled a scratch pad register MSPR and general registers MGR0 and MGR1. In addition, a program status word PSW is coupled to the internal buses E and T.

The above mentioned structure of the microprocessor is also fundamental and well known to persons skilled in the art, and therefore, further description will be omitted.

Figure 4:
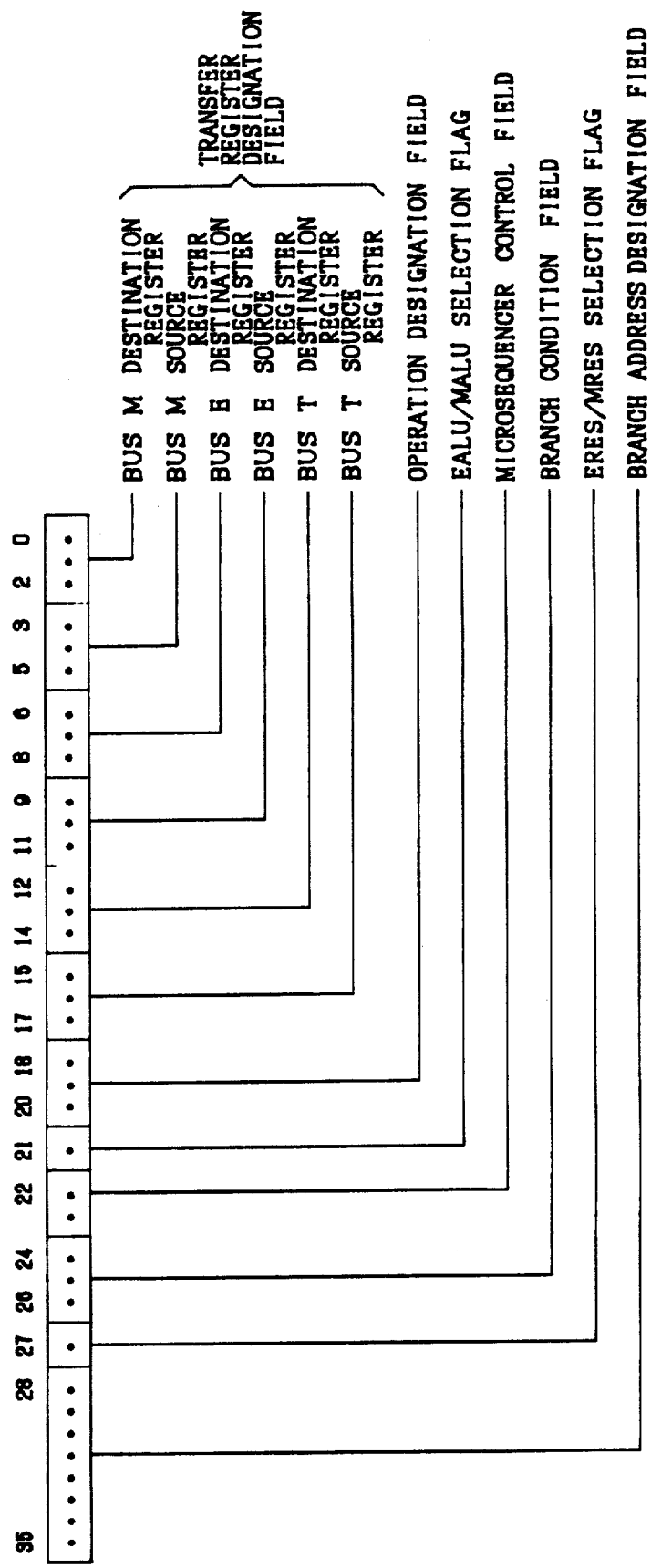
FIG. 4 illustrates a field structure of a microcode used in the microprocessor shown in FIG. 3.

In the microprocessor shown in FIG. 4, the source registers and the destination registers which can be selected for the internal buses T, E and M in the case of interregister transfer are as indicated in the following TABLES 5, 6 and 7.

TABLE 5

| BUS | SOURCE REGISTER | CODE | DESTINATION REGISTER | CODE |
|---|---|---|---|---|
| T | TGR0 | 000 | TGR0 | 000 |
|   | TGR1 | 001 | TGR1 | 001 |
|   | TSPR | 010 | TSPR | 010 |
|   | ERES | 011 | EOPA | 011 |
|   | —    | —   | EOPB | 100 |
|   | PSW  | 101 | PSW  | 101 |
|   | COMR | 111 | COMR | 111 |

TABLE 6

| BUS | SOURCE REGISTER | CODE | DESTINATION REGISTER | CODE |
|---|---|---|---|---|
| E | EGR0 | 000 | EGR0 | 000 |
|   | EGR1 | 001 | EGR1 | 001 |
|   | ESPR | 010 | ESPR | 010 |
|   | ERES | 011 | EOPA | 011 |
|   | —    | —   | EOPB | 100 |
|   | PSW  | 101 | PSW  | 101 |
|   | PC   | 110 | PC   | 110 |
|   | COMR | 111 | COMR | 111 |

TABLE 7

| BUS | SOURCE REGISTER | CODE | DESTINATION REGISTER | CODE |
|---|---|---|---|---|
| M | MGR0 | 000 | MGR0 | 000 |
|   | MGR1 | 001 | MGR1 | 001 |
|   | MSPR | 010 | MSPR | 010 |
|   | MRES | 011 | MOPA | 011 |
|   | —    | —   | MOPB | 100 |
|   | PC   | 110 | PC   | 110 |
|   | COMR | 111 | COMR | 111 |

In the case of designating the transfer registers in a manner similar to the case of the processor shown in FIG. 1, a field for designating the source register and another field for designating the destination register respectively require three bits for each of a transfer using the but T, a transfer using the bus E and a transfer using the bus M. Namely, only the transfer register designation field needs 18 bits in total. In addition, since the arithmetic logic unit is increased to two, in association with the operation designation field (TABLE 2) and the branch condition designation field (TABLE 4) an EALU/MALU selection flag and an ERES/MRES selection flag are required in order to indicate which is instructed to execute the operation, the main arithmetic logic unit MALU or the extra arithmetic logic unit EALU. In this case, the microcode has to have the instruction word length of 36 bits as illustrated in FIG. 4.

In order to shorten the word length of the microcode as short as possible, one of the conventional microprogram control systems has proposed to previously prepare some number of source register sets each designating one source register for each of the internal buses and some number of destination register sets each designating one destination register for each of the internal buses, as shown in the following TABLE 8.

TABLE 8

| SOURCE REGISTER SET | | | | DESTINATION REGISTER SET | | | |
|---|---|---|---|---|---|---|---|
| T BUS | E BUS | M BUS | CODE | T BUS | E BUS | M BUS | CODE |
| TGR0 | EGR0 | MGR0 | 0000 | TGR0 | EGR0 | MGR0 | 0000 |
| TGR1 | EGR1 | MGR1 | 0001 | TGR1 | EGR1 | MGR1 | 0001 |
| TSPR | ESPR | MSPR | 0010 | TSPR | ESPR | MSPR | 0010 |
| ERES | ERES | MRES | 0011 | NOS* | EOPA | MOPA | 0011 |
| TGR0 | EGR0 | MSPR | 0100 | NOS* | EOPB | MOPB | 0100 |
| TGR0 | ESPR | MGR0 | 0101 | NOS* | NOS* | MOPA | 0101 |
| TSPR | EGR0 | MGR0 | 0110 | NOS* | NOS* | MOPB | 0110 |
| TGR0 | EGR0 | MRES | 0111 | NOS* | EOPA | NOS* | 0111 |
| TGR0 | ERES | MGR0 | 1000 | NOS* | EOPB | NOS* | 1000 |
| ERES | EGR0 | MGR0 | 1001 | EOPA | NOS* | NOS* | 1001 |
| TSPR | ESPR | MRES | 1010 | EOPB | NOS* | NOS* | 1010 |
| TSPR | ERES | MSPR | 1011 | NOS* | PSW  | NOS* | 1011 |
| ERES | ESPR | MSPR | 1100 | COMR | PC   | NOS* | 1100 |
| ERES | PSW  | COMR | 1101 | NOS* | NOS* | COMR | 1101 |
| ERES | COMR | MRES | 1110 | NOS* | COMR | NOS* | 1110 |
| COMR | PC   | MRES | 1111 | NOS* | NOS* | NOS* | 1111 |

*NOS is an abbreviation of "no select" which means that no destinatin register is designated.

In this case, one of the source register sets and one of the destination register sets are selected so that the contents of registers designated by the selected source register sets are transferred to registers designated by the destination source register sets, respectively. Accordingly, the source register designation fields included in one instruction (microcode) can be reduced to one field and the destination register designation fields can also be reduced to one field.

Figure 5:
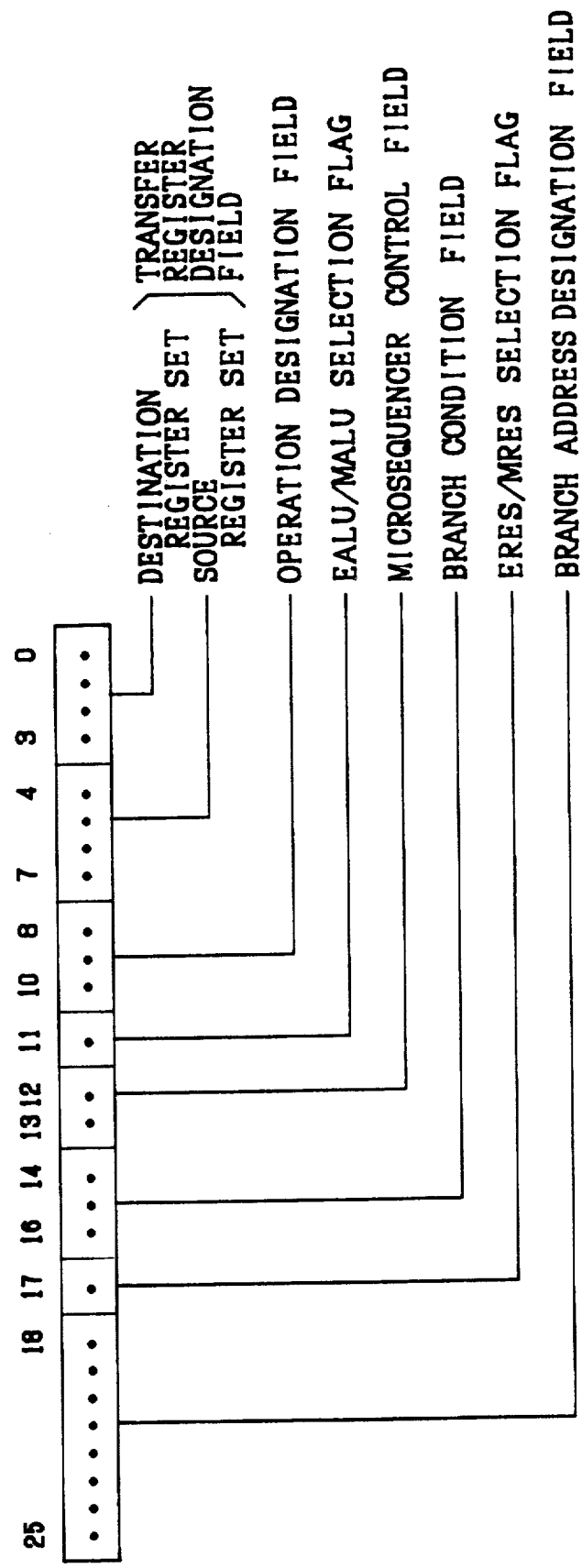
FIG. 5 illustrates a field structure of a microcode used in the microprocessor shown in FIG. 3 in the case that transfer registers are previously combined into some number of sets.

Referring to FIG. 5, there is shown a field structure of one example of microcodes which can be used in the microprocessor shown in FIG. 3 in which the transfer registers are previously combined into some number of sets.

In the microcode shown in FIG. 5, the transfer register designation field is composed of eight bits as seen from TABLE 8. Namely, the 0th to 3rd bits form the destination register set field and the 4th to 7th bits form the source register set field. In addition, the 8th to 10th bits form the operation designation field for the extra arithmetic logic unit EALU or the main arithmetic logic unit MALU. The 11th bit is the EALU/MALU selection flag for indicating to which the operation designated by the operation designation field is directed, the extra arithmetic logic unit EALU or the main arithmetic logic unit MALU. The 12th and 13th bits form the microsequencer control field, and the 14th to 16th bits constitute the branch condition designation field for indicating a branch condition or a call condition in the case of the conditional branch or the subroutine call being designated by the microsequencer control field. The 17th bit is the ERES/MRES selection flag for indicating to which the condition designated by the branch condition designation field is directed, the register ERES or MRES. The 18th to 26th bits form the branch address designation field for indicating a head address of the branch destination and the subroutine in the case that the conditional branch or the subroutine call is designated by the microsequence control field. Thus, the microcode for the transfer register designation system has the word length of 26 bits.

In the case that the transfer register sets are previously fixedly prepared as shown in TABLE 8, the interregister transfer can be executed as described below.

For example, assume that a microprogram requires the following transfer:

BUS T: ERES —> TGRO  
BUS E: ESPR —> EOPA  
BUS M: MRES —> MNGRO  
(1)

In this case, such a combination of register sets as ERES=TGRO; ESPR=EOPA and MRES=MOPA (where "source register"="destination register") as requested by the instruction is not found in TABLE 8. Therefore, there are firstly used the source register set of the code "0011" and the destination register set of the code "0000" so that a first transfer is executed as follows:

ERES=TGRO; ERES=EGRO and  
MRES=MGRO (first transfer) ...  
(2)

Namely, the data transfer is executed by using the buses T and M. Thereafter, the source register set of the code "0010" and the destination register set of the code "0111" are selected so that a second transfer is executed as follows:

TSPR=NOS; ESPR=EOPA and MSPR=NOS  
(second transfer) ...  
(3)

However, an unintended transfer is made in the first transfer and the content of the register EGRO is destroyed. If it is necessary to reserve the content of the register EGRO, the following transfer must be executed, for example.

|  | source code | destination code |
|---|---|---|
| TSPR=NOS; ESPR=EOPA; MSPR=NOS | = 0010 (first transfer) | 0111 |
| TGRO=TSPR; EGRO=ESPR; MSPR=MSPR | = 0100 (second transfer) | 0010 |
| ERES=TGRO; ERES=EGRO; MRES=MGRO | = 0011 (third transfer) | 0000 |
| TGRO=TGRO; ESPR=EGRO; MGRO=MGRO | = 0101 (fourth transfer) | 0000 |

Namely, the transfer to the register EOPA is firstly executed (the first transfer) and then the content of the register EGRO is saved by using the register ESPR as a temporary save register (the second transfer). Thereafter, the data transfer is executed for the buses T and M (third transfer). As a result, the content of the register EGRO is destroyed, but the content saved in the register ESPR is returned to the register EGRO (fourth transfer). This sequence is very complicated and needs many transfer steps.

As mentioned above, the conventional improved transfer register designation system previously prepares some number of source register sets each designating one source register for each of the internal buses and some number of destination register sets each designating one destination register for each of the internal buses, and then, selects one of the source register sets and one of the destination register sets when the interregister transfer is executed. In this system, however, even if it is not required to transfer data between all the registers designated by one combination of source register set and destination register set, data transfer is executed between all the designated registers without exception. As a result, the content of an unintended destination register is destroyed. In order to avoid this problem, the microcode must be written to select a register whose content is allowed to be destroyed, as the register which will unintentionally be destroyed by the data transfer. Otherwise, it is necessary to select a combination including a not-selected register, indicated by "NOS" in TABLE 8. Therefore, the degree of freedom in describing the microprograms is greatly limited. In addition, if the microprogram is written to save the content of the register which will unintentionally be destroyed by the data transfer, to a register which will not be used for the requested data transfer, the data transfer sequence becomes very complicated.

Figure 6:
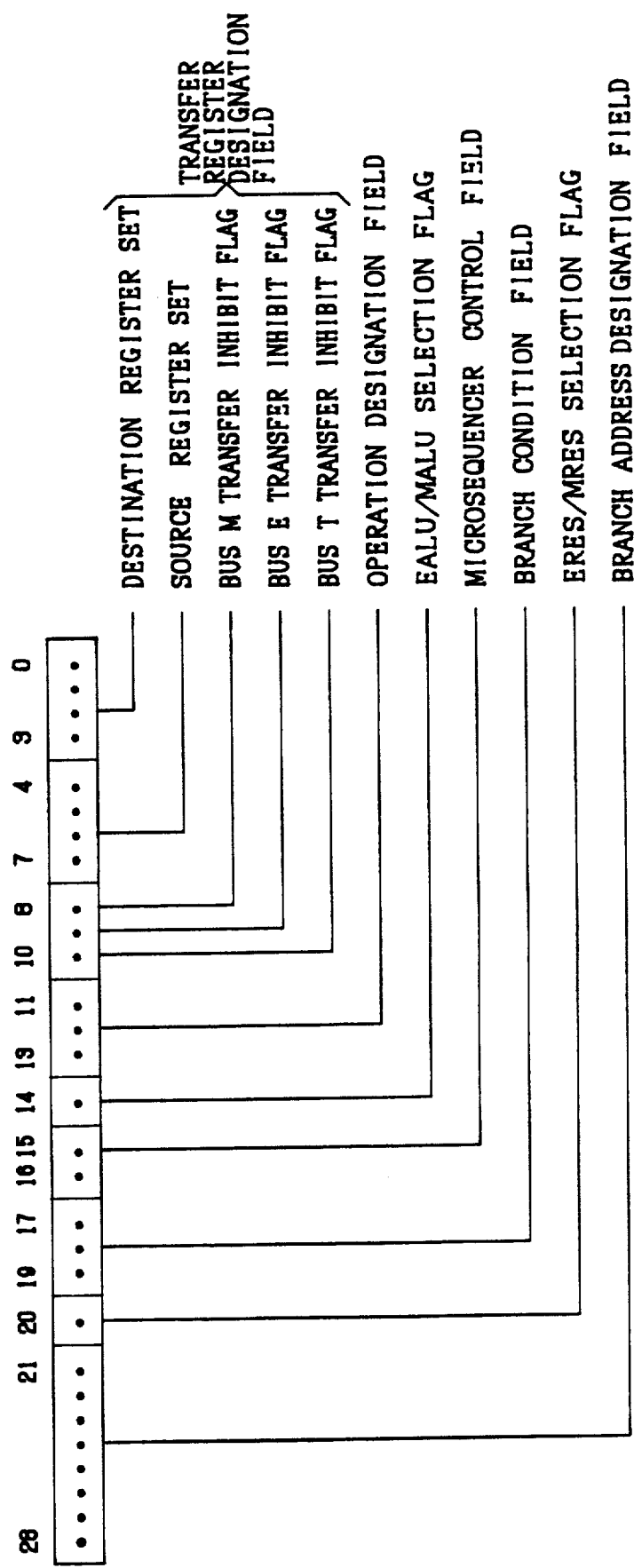
FIG. 6 illustrates a field structure of one embodiment of a microcode for executing the transfer register designation method in accordance with the present invention.

Referring to FIG. 6, there is shown a field structure of a microcode written in accordance with the present invention for executing the above mentioned interregister transfer (1). As seen from FIG. 6, the shown microcode written in accordance with the present invention includes a transfer inhibit flag provided for each of the internal buses M, T and E. With addition of three bits to the microcode, it is possible to prevent, in the course of register set transfer, the destruction of the content of the register which should not be destroyed.

Figure 7:
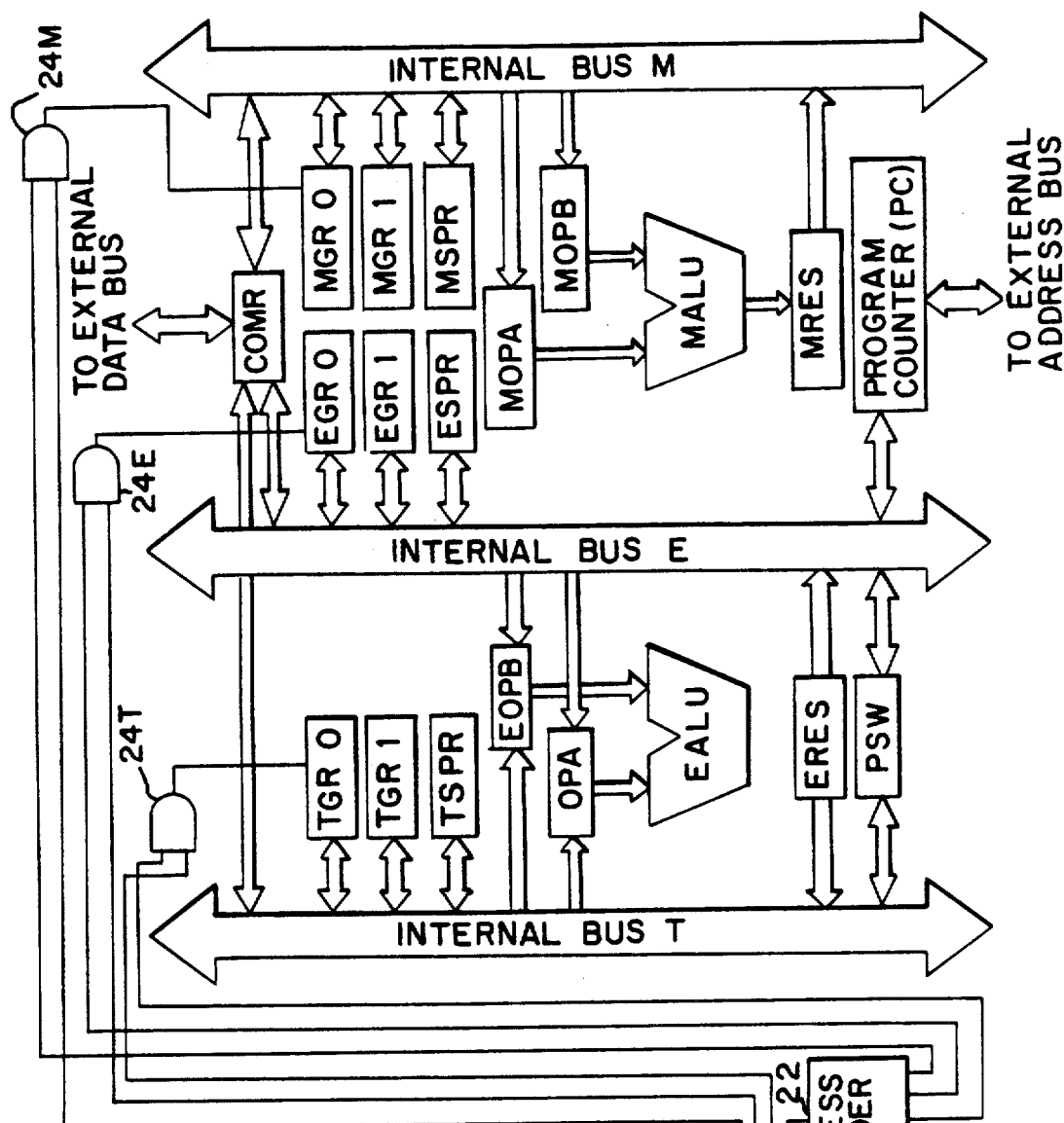
FIG. 7 is a block diagram of one embodiment of a microprocessor having three internal buses, which is capable of executing the transfer register designation method of the present invention in accordance with the microcode shown in FIG. 6.
Figure 7:
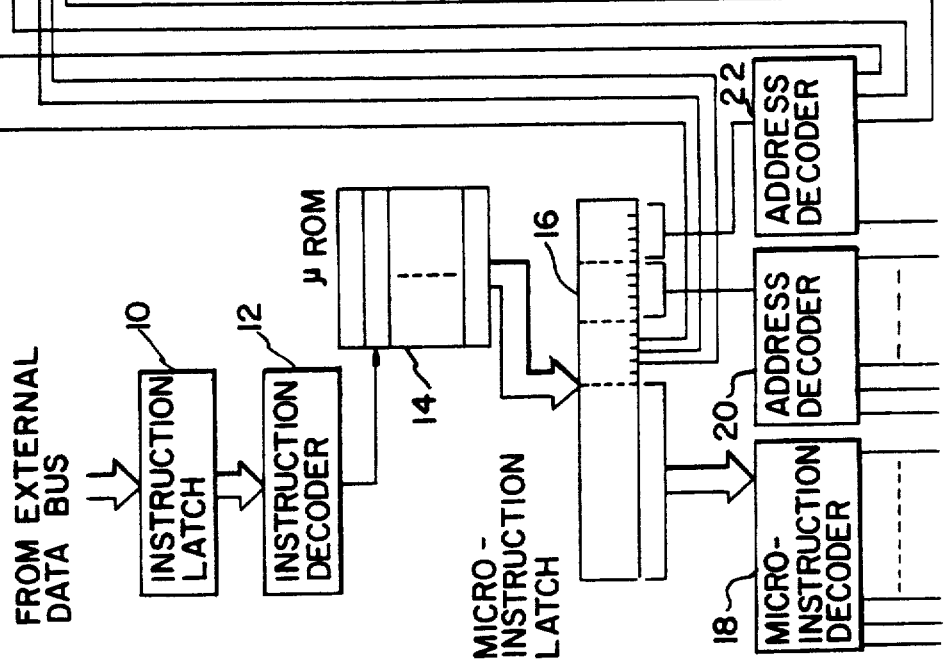

Turning to FIG. 7, there is shown a block diagram of one embodiment of the microprocessor having three internal buses, which is capable of executing the interregister transfer in accordance with the microcode shown in FIG. 6. In FIG. 7, elements similar to those shown in FIG. 3 are given the same reference signs, and explanation thereof will not be repeated.

The shown microprocessor includes an instruction latch 10 for receiving an instruction from the external data bus, and an instruction decoder 12 coupled to the instruction latch 10. This instruction decoder 12 outputs start address information for a designated microprogram to a microprogram ROM (read only memory) 14 whose output is coupled to a microinstruction latch 16. Higher place bits of the latch 16 coupled to a microinstruction decoder 18 which has an output coupled to various elements in the microprocessor. On the other hand, the lowest three bits of the latch 16 are coupled to a write address decoder 22 which generates write signals directed to destination registers indicated by the destination register set code. For example, a write signal for the register TRGO is applied through an AND gate 24T to a write signal input of the register TGRO, and a write signal for the register ERGO is applied through an AND gate 24E to a write signal input of the register EGRO. In addition, a write signal for the register MRGO is applied through an AND gate 24M to a write signal input of the register MRGO. The other write signals generated by the write address decoder 22 are applied to the other registers in a similar manner. Furthermore, the next lower three bits of the latch 16 are coupled to a read address decoder 20 which generates read signals directed to source registers indicated by the source register set code. These read signals are applied to the registers in a manner similar to the case of the write signals.

Furthermore, each of the transfer inhibit flags is connected to the AND gates connected to the write signal inputs of all the registers coupled to the corresponding internal bus. For example, the transfer inhibit flag for the bus T is connected to the other input of the AND gate 24T connected to the write signal input of the register TGRO. The transfer inhibit flag for the bus E is connected to the other input of the AND gate 24E connected to the write signal input of the register EGRO. The transfer inhibit flag for the bus M is connected to the other input of the AND gate 24M connected to the write signal input of the register MGRO.

Thus, taking into consideration the interregister transfer shown by the above mentioned transfer equation (2) and (3), the transfer inhibit flag for the bus E is stood in the first transfer ("0" is set for the transfer inhibit flag for the bus E and "1" is set for the transfer inhibit flags for the buses T and M) and none of the transfer inhibit flags is stood in the second transfer ("1" is set for all the transfer inhibit flags). Namely, the following transfer sequence is executed:

$$ERES = TGRO; \ ERES = EGRO \text{ and } MRES = MGRO \quad (2)$$
(where Bus E is transfer inhibit)
(first transfer)

$$TSPR = NOS; \ ESPR = EOPA \text{ and } MRES = NOS \quad (3)$$
(second transfer) . . .

Accordingly, when the first transfer register set code is decoded, the AND gate 24E associated to the register EGRO is blocked and therefore the content of the register EGRO is maintained as it is. Thus, the desired interegister data transfer can be executed without destroying the content of the register EGRO and with a small number of steps.

The invention has thus been shown and described with reference to the specific embodiments. However, it should be noted that the present invention is in no way limited to the details of the illustrated structures but changes and modifications may be made within the scope of the appended claims.

I claim:

1. A microprogram controlled microprocessor comprising:

first, second and third internal data buses;
a first arithmetic logic unit having a pair of inputs respectively coupled to a pair of operand registers coupled to the first internal data bus and an output coupled to an operation result register coupled to the first internal data bus;
a second arithmetic logic unit having a pair of inputs respectively coupled to a pair of operand registers coupled to the second and third internal data buses and an output coupled to an operation result register coupled to the second and third internal data buses;
first, second and third scratch pad registers coupled to the first, second and third internal data buses, respectively;
first, second and third general registers coupled to the first, second and third internal data buses, respectively;
a microprogram read only memory for storing a microprogram;
a microinstruction latch, coupled to the microprogram read only memory, for latching a microcode from the microprogram read only memory;
at least one address decoder, coupled to the microinstruction latch, for generating a set of write signals for internal registers;
wherein there are previously created some number of source register sets each designating one source register for each of the internal data buses and some number of destination register sets each designating one destination register for each of the internal data buses, and then, one of the source register sets and one of the destination register sets is selected when an interregister transfer is executed,
wherein at least one register of the scratch pad and general registers coupled to each of the first, second and third internal data buses includes an AND gate having an output coupled to a write signal input of the at least one register itself and a first input coupled to receive a corresponding write signal from the address decoder, and wherein an internal bus transfer inhibit flag is included in a transfer register designation field of a microcode latched in the microinstruction latch and is inputted to a second input of the AND gate of the register coupled to the corresponding internal bus for inhibiting writing to the register designated by the transfer inhibit flag.

2. A microprogram controlled microprocessor, comprising:

first, second and third internal data buses;
a first arithmetic logic unit having a pair of inputs respectively coupled to a pair of operand registers coupled to the first internal data bus and an output coupled to an operation result register coupled to the first internal data bus;

a second arithmetic logic unit having a pair of inputs respectively coupled to a pair of operand registers coupled to the second and third internal data buses and an output coupled to an operation result register coupled to the second and third internal data buses;

first, second and third groups of internal registers coupled to the first, second and third internal data buses, respectively, each group of internal registers including a plurality of internal registers;

a microprogram read only memory for storing a microprogram;

a microinstruction latch, coupled to the microprogram read only memory, for latching a microcode from the microprogram read only memory;

at least one address decoder, coupled to the microinstruction latch, for generating a set of data transfer signals for internal registers;

wherein there are previously created a number of source register sets each designating one source register for each of the internal data buses and a number of destination register sets each designating one destination register for each of the internal data buses, and then, one of the source register sets and one of the destination register sets is selected when an interregister transfer is executed, wherein at least one register of a corresponding group of registers coupled to each of the first, second and third internal data buses includes a data transfer inhibit circuit, having an output coupled to a data transfer control input of the at least one register itself and a first input coupled to receive a corresponding data transfer signal from the address decoder, and wherein an internal bus transfer inhibit flag, included in a transfer register designation field of a microcode latched in the microinstruction latch, is inputted to a second input of the data transfer inhibit circuit of the register coupled to the corresponding internal bus for inhibiting data transfer of the register designated by the transfer inhibit flag.

3. A microprogram controlled microprocessor, comprising:

a plurality of internal buses;

a plurality of groups of registers coupled to the plurality of internal buses, respectively, each group of registers including a plurality of registers;

a microinstruction latch for latching a microinstruction, the microinstruction including a first field for designating some of the registers as source registers such that one register of a corresponding group of registers coupled to each of the internal buses is designated as a source register for one corresponding internal bus, and the microinstruction including a second field for designating some of the registers as destination registers such that one register of a corresponding group of registers coupled to each of the internal buses is designated as a destination register for one corresponding internal bus, the microinstruction also including a third field indicating which internal bus is put in a transfer allowable condition and which internal bus is put in a transfer inhibit condition; and means, coupled to the microinstruction latch, for decoding the third field of the microinstruction, the means coupled to the registers for executing data transfer through an internal bus which is designated as being in the transfer allowable condition by the third field of a decoded microinstruction, from the source register coupled to the internal bus in the transfer allowable condition to the destination register coupled to the internal bus in the transfer allowable condition, the means also operating to inhibit data transfer through an internal bus which is designated as being in the transfer inhibit condition by the third field of the decoded microinstruction.

4. A microprogram controlled microprocessor as claimed in claim 3, wherein the third field of a microinstruction includes a plurality of transfer inhibit flags each corresponding to one of the internal buses, each of the transfer inhibit flags alternatively having a first logic level indicative of the transfer allowable condition and a second logical level indicative of the transfer inhibit condition.

* * * * *